Figure 1:
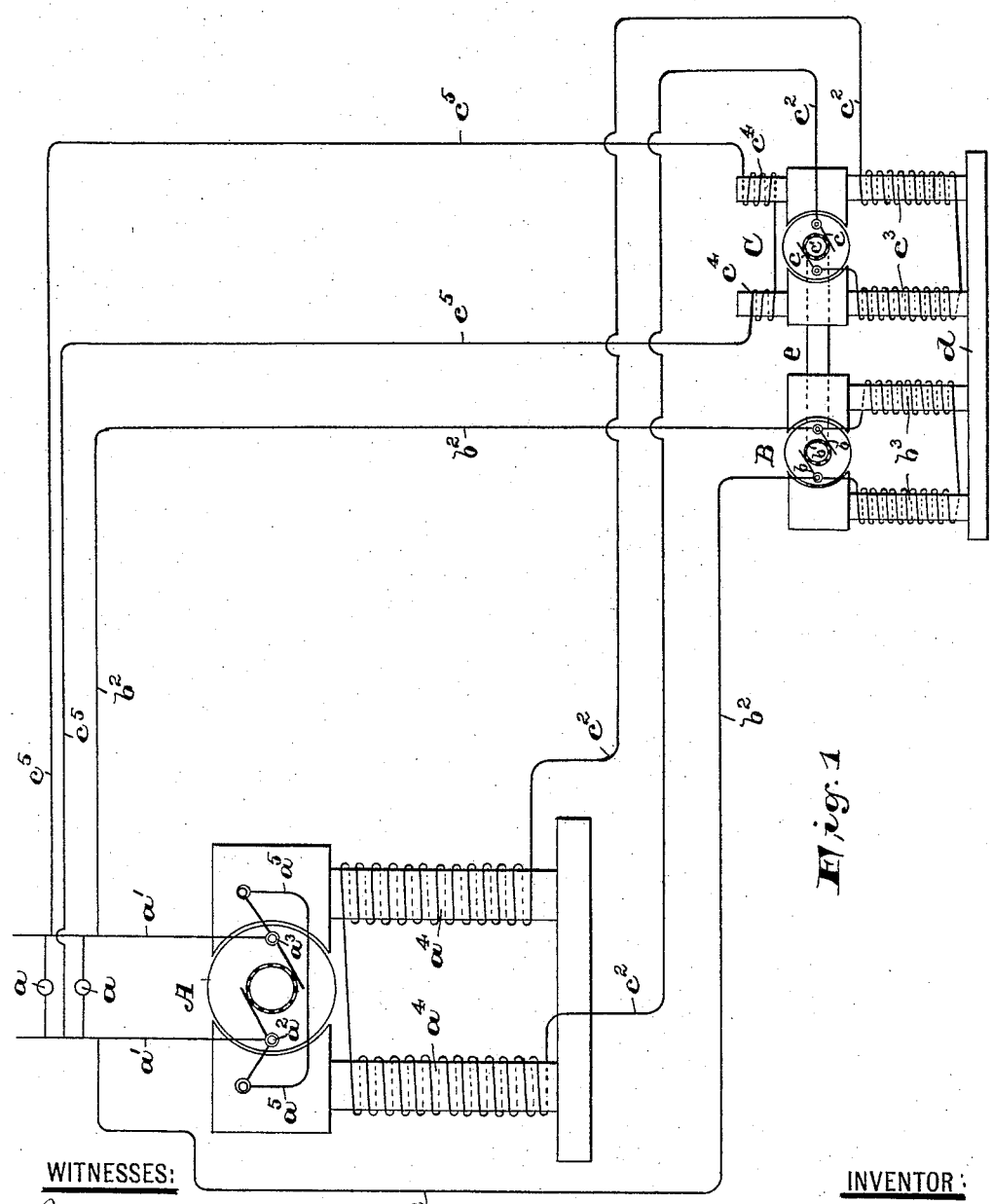

(No Model.) 2 Sheets—Sheet 1.
M. MOSKOWITZ.
MEANS FOR EQUALIZING ELECTROMOTIVE FORCE OF DYNAMOS.
No. 525,993. Patented Sept. 11, 1894.

WITNESSES:
M. B. Fraentzel,
H. M. Marsh

INVENTOR:
Morris Moskowitz,
BY Fred C. Fraentzel, ATT'Y.

(No Model.) 2 Sheets—Sheet 2.

M. MOSKOWITZ.
MEANS FOR EQUALIZING ELECTROMOTIVE FORCE OF DYNAMOS.

No. 525,993. Patented Sept. 11, 1894.

WITNESSES:
W. B. Fraentzel
H. W. Marsh

INVENTOR:
Morris Moskowitz,
BY Fred C. Fraentzel, ATT'Y.

UNITED STATES PATENT OFFICE.

MORRIS MOSKOWITZ, OF NEWARK, NEW JERSEY, ASSIGNOR, BY DIRECT AND MESNE ASSIGNMENTS, TO THE NATIONAL ELECTRIC CAR LIGHTING COMPANY.

MEANS FOR EQUALIZING ELECTROMOTIVE FORCE OF DYNAMOS.

SPECIFICATION forming part of Letters Patent No. 525,993, dated September 11, 1894.

Application filed June 15, 1894. Serial No. 514,690. (No model.)

*To all whom it may concern:*

Be it known that I, MORRIS MOSKOWITZ, a citizen of the United States, residing at Newark, in the county of Essex and State of New Jersey, have invented certain new and useful Improvements in Means for the Purpose of Equalizing the Electromotive Force of Dynamos or other Electrical Apparatus Running under Variable Speed; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in machines for generating electricity for electric lighting or any other purpose, where electricity is to be used, and has for its object to produce an automatic controlling device for the purpose of equalizing the electromotive force of dynamos or other electrical apparatus running under variable speed, whereby the dynamo or such other electrical apparatus employed will maintain a constant difference of potential at the terminals of the dynamo electric generator.

It is a well-known fact that the electromotive force of an ordinary separately excited dynamo varies as the speed of the armature increases or decreases, and to maintain a constant potential, I have devised an electrical apparatus, connected in circuit with the dynamo electric generator, to decrease or increase the intensity of its magnetic field, to make up for the increase or decrease of the speed of its armature, with the object in view, that a constant and uniform electro-motive force is maintained in the generating armature. To obtain this result, I construct two electrical machines or apparatus, arranged side by side on one base, having one shaft extending through the armature of both of said machines, one machine acting as a motor to operate said shaft, and receiving its power directly from said dynamo-electric generator, the electro-motive force of which is to be maintained constant, and said second machine acting as a dynamo-electric machine, its armature and magnetic field being so coupled with the fields of the dynamo electrical generator that its electro-motive force will oppose that generated by said dynamo generator in the main circuit.

The invention therefore consists of the arrangements and combinations of parts to be hereinafter more fully described and finally embodied in the clauses of the claim.

The invention is illustrated in the accompanying sheets of drawings, in which—

Figure 2:
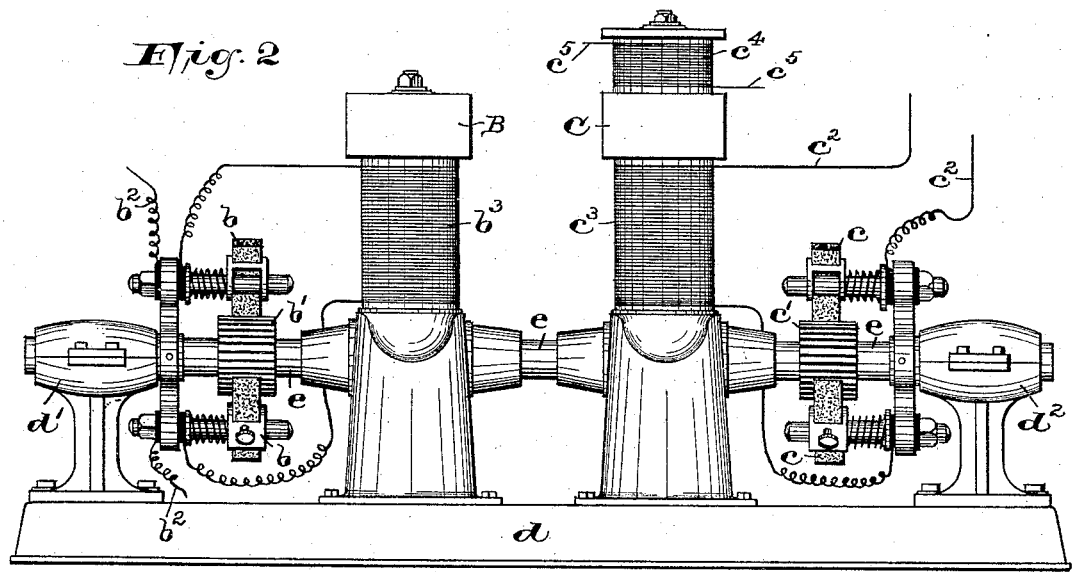
Figure 3:
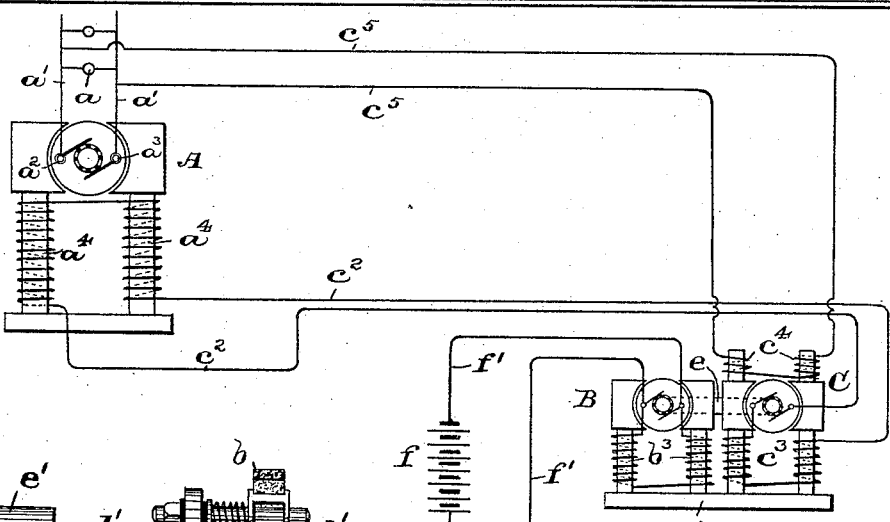
Figure 4:
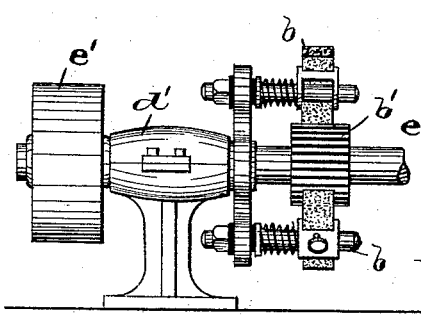

Figure 1 is a diagrammatic view, illustrating the arrangement of a dynamo electric generator in circuit with the electric apparatus, forming a combined generating and regulating dynamo machine, the generating portion of said machine being in circuit with the main circuit connected with the dynamo electric generator. Fig. 2 is a side elevation of the combined generating and regulating dynamo-machine. Fig. 3 is a diagrammatic view, similar to that illustrated in said Fig. 1, but the generating or motor portion of said regulating apparatus being in circuit with a battery from which it derives its power. Fig. 4 is a detail view of the one end of the generating or motor portion of said regulating apparatus, illustrating the armature shaft of the apparatus provided with a pulley-wheel for operating the apparatus mechanically instead of by electricity.

In said drawings, A indicates the dynamo-electric generator, of any suitable construction for supplying electricity to electric lights $a$, or other electrical devices in the main circuit $a'$, $a'$, connected up with the brushes $a^2$ and $a^3$ of said generator in the usual manner.

The combined generating and regulating dynamo machine is illustrated more especially in Fig. 2 of the drawings, and consists of a suitable motor B and a suitable dynamo C of any desirable construction, both of which are erected upon the same support or base $d$.

A combined shaft $e$, having a constant speed, extends through the armature of said motor B and said dynamo C, and on said shaft are the motor brushes $b$ and commutator $b'$ at the one end, and the dynamo brushes $c$ and commutator $c'$ at the other end of the shaft. Suitable bearings $d'$ and $d^2$ are employed for supporting said shaft $e$ on said base $d$, as shown.

As will be seen from Fig. 1, the brushes $b$ of said motor B are in circuit with the main circuit $a'$, $a'$, by means of the wires $b^2$, $b^2$, whereby, as soon as the generator A is operated from any outside source, the electricity generated by said generator A will pass through the wires $b^2$, $b^2$, thereby energizing the fields $b^3$, $b^3$ of said motor B, and thus driving the armature shaft $e$, as will be clearly understood. At the same time the brushes $c$ and armature $c'$ on said shaft $e$ will cause the fields $c^3$, $c^3$, of the dynamo C to become excited. One of the brushes $c$ and one of said fields $c^3$ of the dynamo C are in circuit through the wires $c^2$, $c^2$, with the field coils $a^4$, $a^4$ of the dynamo-electric generator A, as will be seen from Figs. 1 and 3. Said dynamo C is also constructed that its fields $c^3$, $c^3$, are extended, as will be seen from the several figures of the drawings, being in circuit through the coils $c^4$, $c^4$, and the wires $c^5$, $c^5$, connected with the main circuit $a'$, $a'$, of the electric generator A, whereby said circuit is charged by the generator A, so that its electro-motive force opposes the electro-motive force from the dynamo C sufficiently to control the strength of the magnetic fields in said generator A.

In Fig. 1, $a^5$ is a shunt circuit, connecting the two brushes $a^2$ and $a^3$ of the generator A, whereby just sufficient electro-motive force is generated in starting up the machinery to start the motor B, after which it derives its power from the main circuit $a'$, $a'$.

The operation is as follows: Suppose the generator A has been started, deriving its power from any outside source under considerable variation in speed. Said generator A feeds the main circuit and also the motor B in the circuit $b^2$, $b^2$, connected with said main circuit $a'$, $a'$, thereby immediately operating the self-regulating dynamo C. Now, as the speed of the generator A increases, so will its electro-motive force increase, but at the same time a counter-acting current is created in the dynamo C, its armature having a uniform speed, which acts through the circuit wires $c^2$, $c^2$, through the coils $a^4$, $a^4$, and thereby decreases the strength of the magnetic fields of the generator A, and hence immediately reduces the armature output of the generator A; but at the same time, the electro-motive force of said dynamo C, is weakened by the opposing current and the oppositely wound coils $c^4$, $c^4$, excited from the main circuit $a'$, $a'$, will proportionately reduce the strength of the magnetic fields of said regulating dynamo C. Thus it will be seen that I have devised an automatically operating controlling device, which is very simple and still operative, for the purpose of equalizing the electro-motive force of the dynamo-electric generator A, running under variable speeds, and maintaining a constant difference of potential at the terminals of said electric generator. Instead of operating said combined motor and regulating dynamo machine with the current generated by the generator A, said small motor connected with said regulating dynamo may have its operative source in a suitable battery $f$, arranged in the circuit $f'$, $f'$, as clearly shown in Fig. 3, or the shaft $e$ of the motor B may be operated by a pulley on said shaft, by mechanical means from some other source, as will be evident from the detail view, illustrated in Fig. 4.

Having thus described my invention, what I claim is—

1. In a means for the purpose of equalizing the electro-motive force of dynamos or other electrical apparatus running under variable speed, the combination, of a dynamo electric generator, and a combined motor and regulating dynamo, the armature circuit of said regulating dynamo being in circuit with the magnetic fields of said dynamo-electric generator, so that the electro-motive force of said regulating dynamo excites and controls the intensity of the magnetic fields of said dynamo-electric machine, and means connected with the combined motor and dynamo shaft for operating the same, and an opposing circuit connecting the field coils of said regulating dynamo with the main circuit connected with said dynamo-electric generator, counter-acting the electro-motive force of said regulating dynamo to maintain the electro-motive force of the dynamo electric generator constant, substantially as and for the purposes set forth.

2. In a means for the purpose of equalizing the electro-motive force of dynamos or other electrical apparatus running under variable speed, the combination, of a dynamo electric generator, and a combined motor and regulating dynamo, comprising therein a combined armature shaft $e$, a motor armature and brushes, and a dynamo armature and brushes on said shaft, the armature circuit of said regulating dynamo being in circuit with the magnetic fields of said dynamo electric generator, so that the electro-motive force of said regulating dynamo excites and controls the intensity of the magnetic fields of said dynamo electric generator, and means connected with the combined dynamo and motor shaft for operating the same, and an opposing circuit connecting the field coils of said regulating dynamo with the main circuit connecting with said dynamo electric generator, counteracting the electro-motive force of said regulating dynamo, to maintain the electro-motive force of the dynamo electric generator constant, substantially as and for the purposes set forth.

In testimony that I claim the invention set forth above I have hereunto set my hand this 16th day of May, 1894.

MORRIS MOSKOWITZ.

Witnesses:
 FREDK. C. FRAENTZEL,
 H. M. MARSH.